(12) United States Patent
Heeps

(10) Patent No.: US 8,667,721 B2
(45) Date of Patent: Mar. 11, 2014

(54) APPARATUS AND METHOD FOR DISPLAYING AN ITEM

(75) Inventor: Andrew N. Heeps, London (GB)

(73) Assignee: Memory Box UK Limited, London (GB)

( * ) Notice: Subject to any disclaimer, the term of this patent is extended or adjusted under 35 U.S.C. 154(b) by 803 days.

(21) Appl. No.: 11/920,001

(22) PCT Filed: May 9, 2006

(86) PCT No.: PCT/GB2006/001705
§ 371 (c)(1),
(2), (4) Date: May 19, 2008

(87) PCT Pub. No.: WO2006/120436
PCT Pub. Date: Nov. 16, 2006

(65) Prior Publication Data
US 2011/0131855 A1    Jun. 9, 2011

(30) Foreign Application Priority Data
May 9, 2005    (GB) .................................. 0509446.1

(51) Int. Cl.
*A47G 1/06*    (2006.01)

(52) U.S. Cl.
USPC .................................. 40/779; 40/767; 40/781

(58) Field of Classification Search
USPC ......... 40/779, 781, 767, 611.02, 611.04, 723, 40/724, 766
See application file for complete search history.

(56) References Cited

U.S. PATENT DOCUMENTS

| 1,104,219 | A | * | 7/1914 | Polverino | 40/749 |
|---|---|---|---|---|---|
| 3,877,165 | A | | 4/1975 | Lumbard | |
| 4,512,094 | A | * | 4/1985 | Seely | 40/791 |
| 5,050,324 | A | * | 9/1991 | Casull | 40/767 |
| 5,996,815 | A | | 12/1999 | Walters et al. | |
| 6,070,350 | A | * | 6/2000 | Fantone et al. | 40/454 |
| 6,446,799 | B1 | | 9/2002 | Simba | |
| 2005/0044767 | A1 | * | 3/2005 | Lasher | 40/757 |
| 2006/0179699 | A1 | * | 8/2006 | Gemmell | 40/661 |

FOREIGN PATENT DOCUMENTS

| CA | 2300701 | 9/2001 |
|---|---|---|
| DE | 20115595 | 1/2002 |
| EP | 0706160 | 4/1996 |
| GB | 630500 | 10/1949 |
| GB | 1295378 | 11/1972 |
| GB | 2289623 | 11/1995 |
| WO | 03010737 | 2/2003 |
| WO | 2006067815 | 6/2006 |

OTHER PUBLICATIONS

English Abstract of EP 0706160.

* cited by examiner

*Primary Examiner* — Joanne Silbermann
*Assistant Examiner* — Kristina Junge
(74) *Attorney, Agent, or Firm* — Dykema Gossett pLLC

(57) ABSTRACT

An apparatus and method for displaying an item such as a vinyl record album on a wall. The apparatus includes first and second parts (6, 4) pivotably mounted to one another, one part including a window through which the item to be displayed may be viewed, one part including a catch element (18) for limiting relative rotation of the two parts, and one part including a hook or screw for mounting the apparatus on a wall.

16 Claims, 6 Drawing Sheets

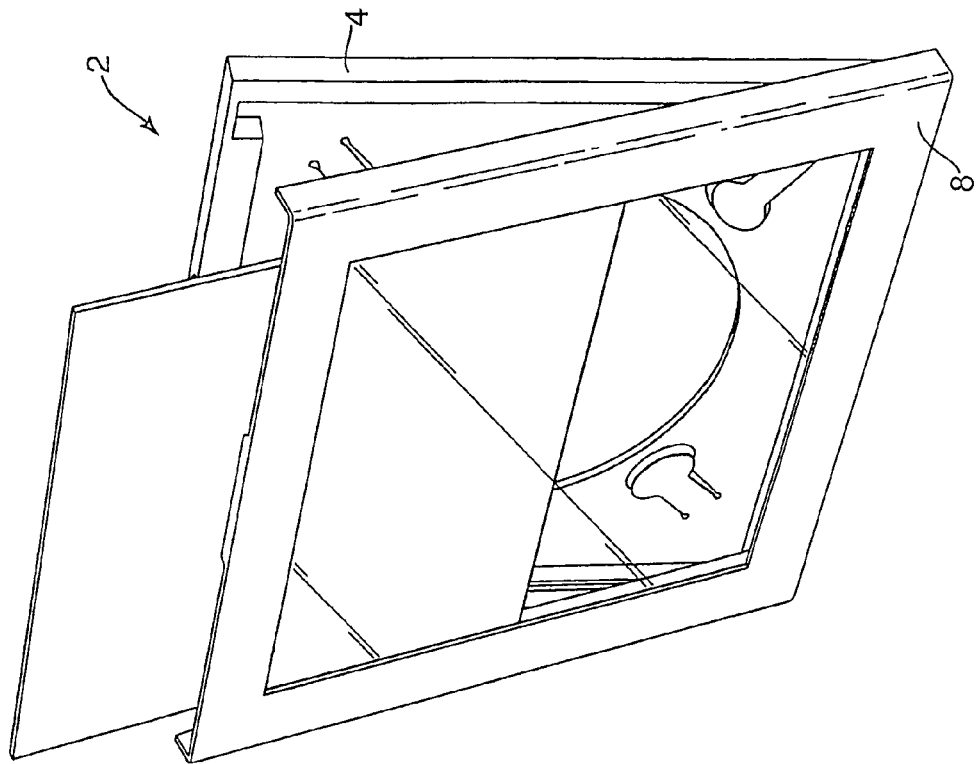
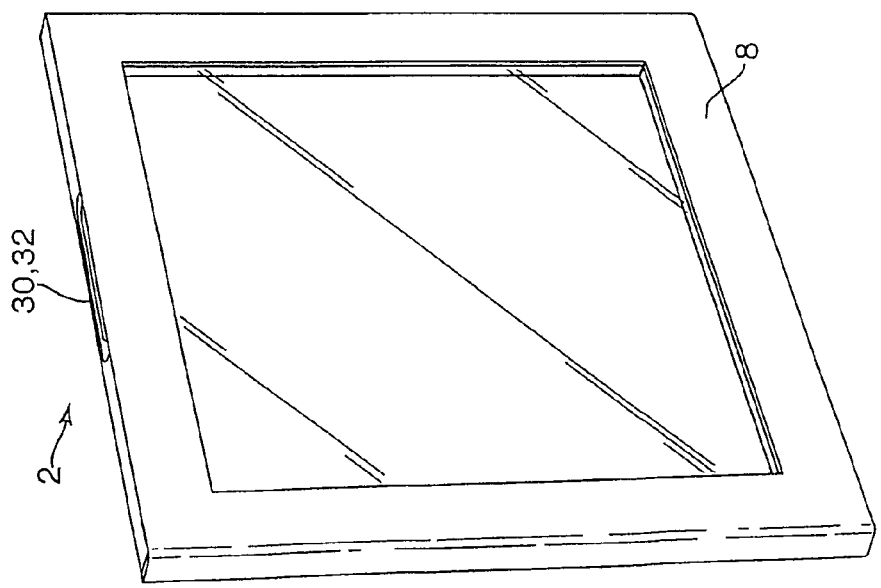

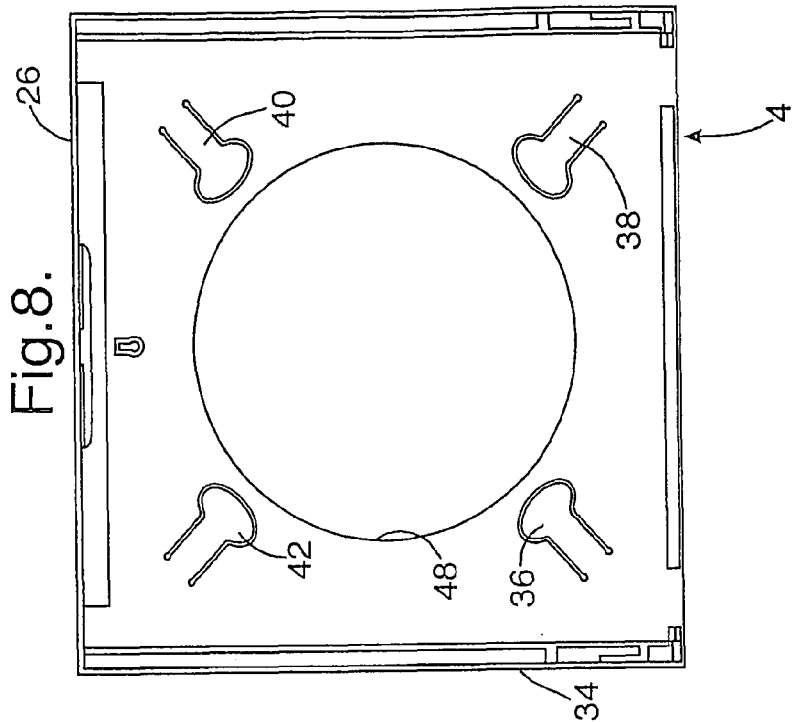
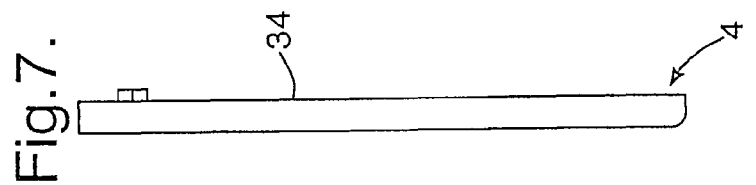
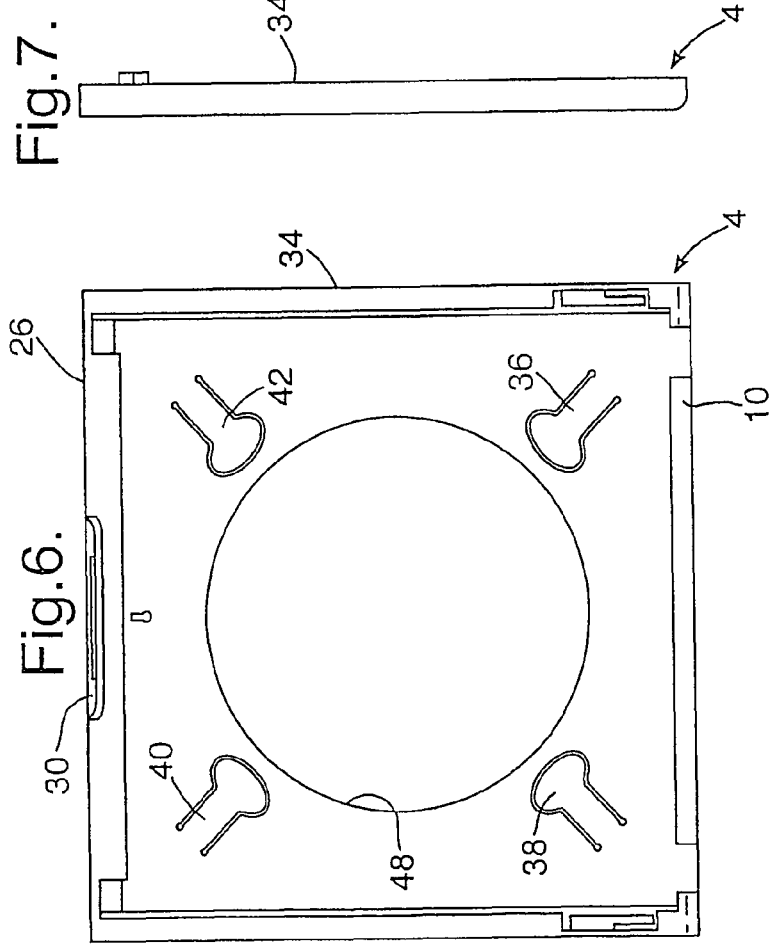
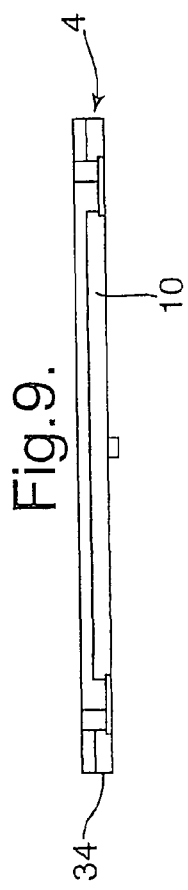

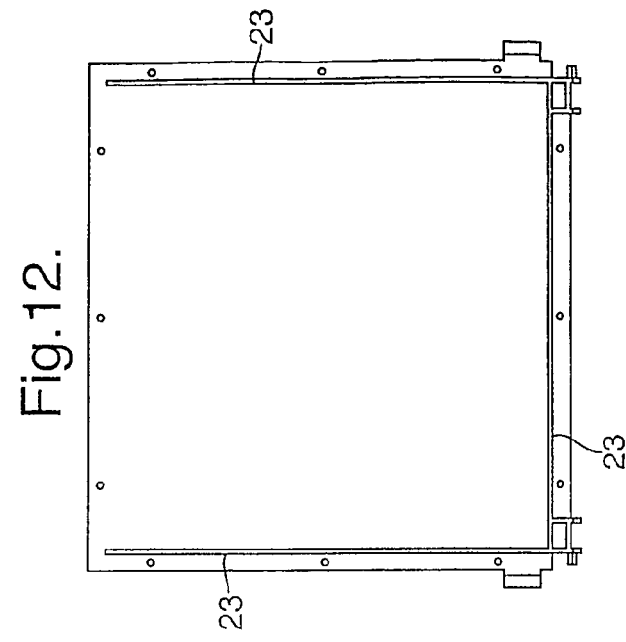
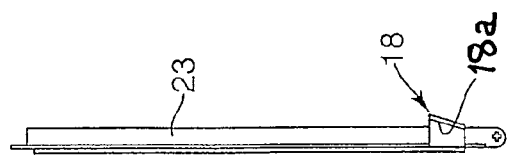
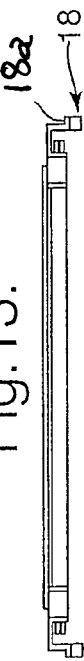
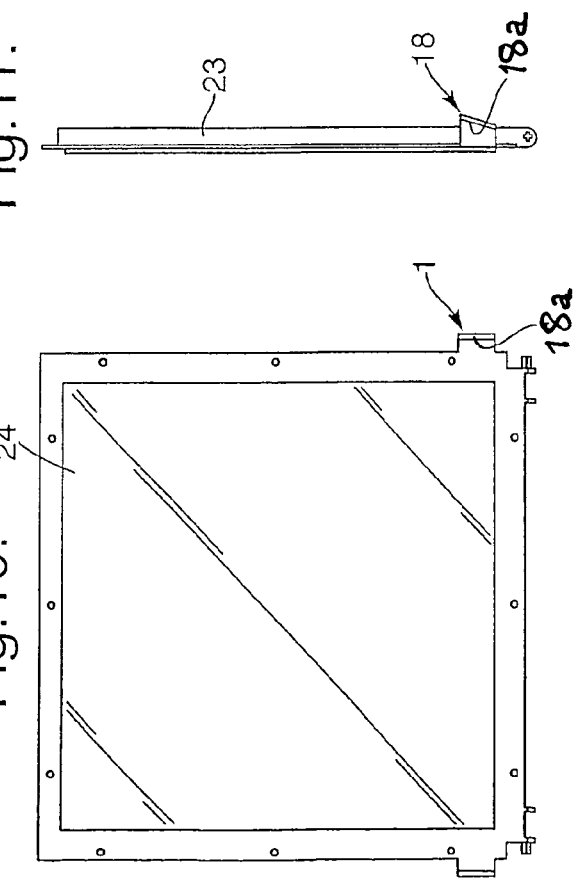

APPARATUS AND METHOD FOR DISPLAYING AN ITEM

BACKGROUND OF THE INVENTION

1. Field of the Invention

The present invention relates to apparatus and methods for displaying an item, and more particularly, but not exclusively, to apparatus and methods for playing vinyl music records on a wall.

2. The Prior Art

Vinyl music records are traditionally held in a paper or cardboard sleeve or wallet when not in use so as to prevent the record from becoming scratched, dirty, or otherwise damaged. The record sleeves are generally provided with artwork which is appropriate to the music contained on the record. Very often the design of the record sleeve will be of sufficient artistic quality to warrant its display, perhaps on a wall. However, whilst artwork in general has a history of being framed for display on a wall, the traditional frames used for this purpose do not lend themselves to being quickly opened for ready access to the artwork held therein. In the case of a record sleeve, it will of course be understood that access to the sleeve is necessary on a frequent basis in order to allow the record held within the sleeve to be used. Accordingly, the displaying of a record sleeve with a traditional picture framing system has been unsatisfactory for those users also wishing to listen to the music contained on the record held within the sleeve being displayed.

It is an object of the present invention to provide a means by which a record sleeve may be displayed whilst allowing ready access to the record held within the sleeve.

SUMMARY OF THE INVENTION

A first aspect of the present invention provides an apparatus for displaying an item, the apparatus comprising first and second parts pivotally mounted to one another; wherein one part comprises a window through which an item to be displayed may be viewed, one part comprises a catch element for limiting relative rotation of the two parts, and one part comprises means for mounting the apparatus to a wall.

Ideally, the apparatus further comprises means for releasably retaining the two parts rotated into abutment with one another. The releasable retaining means may comprise a resiliently deformable clip. Also, one of said two parts may comprise means for pressing an item, located between the two parts, against the other one of said two parts. The pressing means may comprise a resiliently deformable element extending from one of said parts towards the other of said parts. The pressing means is preferably cut and bent from the material of one of said parts.

The catch element is preferably arranged to prevent the two parts from rotating more than 90° relative to one another. More preferably, the catch element is arranged to prevent the two parts from rotating more than 45° relative to one another. Yet more preferably, the catch element is arranged to prevent the two parts from rotating more than 30° relative to one another. Ideally, the catch element is arranged to prevent the two parts from rotating more than 15° relative to one another.

A second aspect of the present invention provides a record sleeve display apparatus as recited above.

A third aspect of the present invention provides a method of using any of the apparatus recited above, the method comprising the step of placing a music record sleeve between said two parts of said apparatus. Furthermore, the apparatus is ideally mounted to a wall.

An embodiment of the present invention will now be described with reference to the accompanying drawings.

BRIEF DESCRIPTION OF THE DRAWINGS

FIG. 4 is a perspective view of the display apparatus arranged in a closed configuration and holding a record sleeve;

FIG. 5 is a perspective view of the display apparatus arranged in an open configuration with a record sleeve partially removed therefrom;

FIG. 6 is a plan view of the front of a backboard of the display apparatus;

FIG. 7 is a side view of the backboard of FIG. 6;

FIG. 8 is a plan view of the rear of the backboard shown in FIG. 6;

FIG. 9 is a bottom view of the backboard of FIG. 6;

FIG. 10 is a plan view of the front of a window of the display apparatus;

FIG. 11 is a side view of the window of FIG. 10;

FIG. 12 is a plan view of the rear of the window shown in FIG. 10;

FIG. 13 is a bottom view of the window of FIG. 10;

DETAILED DESCRIPTION OF THE PREFERRED EMBODIMENT

A display apparatus 2 is shown in the accompanying drawings which is specifically designed for holding a vinyl music record so that a record sleeve associated with the record may be conveniently mounted to a wall. Although the display apparatus 2 is for displaying a record sleeve, the size and shape of the apparatus 2 may be modified so as to allow the display of some other item such as, for example, a compact disc or associated sleeve.

Figure 1:
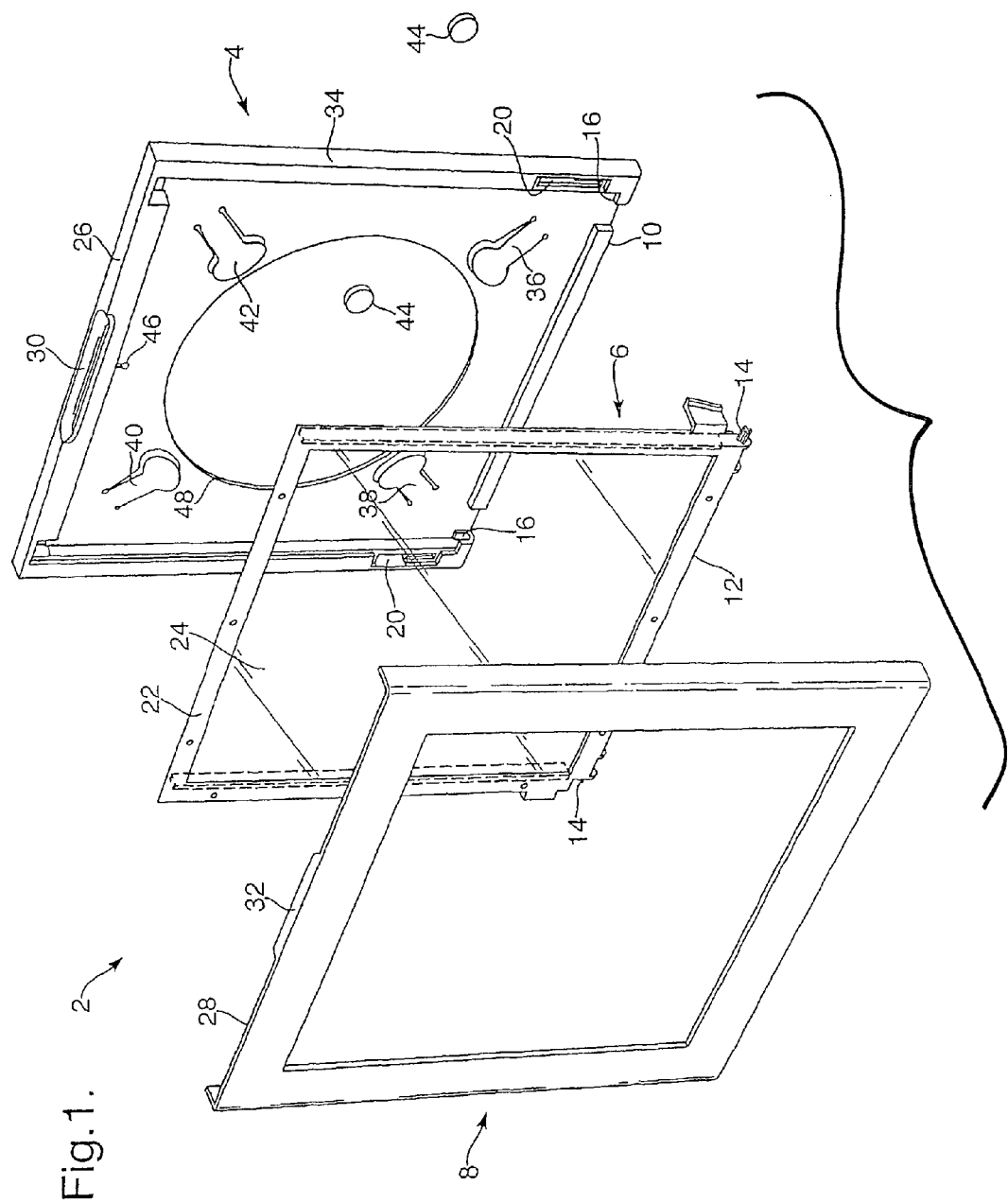
FIG. 1 is an exploded perspective view of a display apparatus according to the present invention.
Figure 3:
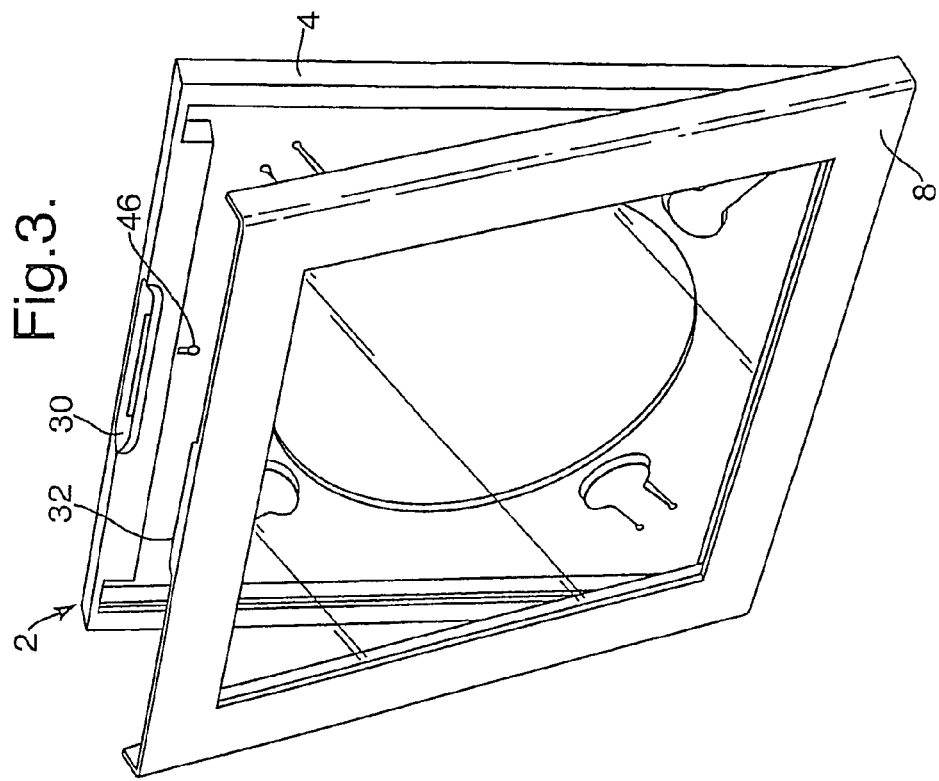
FIG. 3 is a perspective view of the display apparatus arranged in an open configuration.
Figure 2:
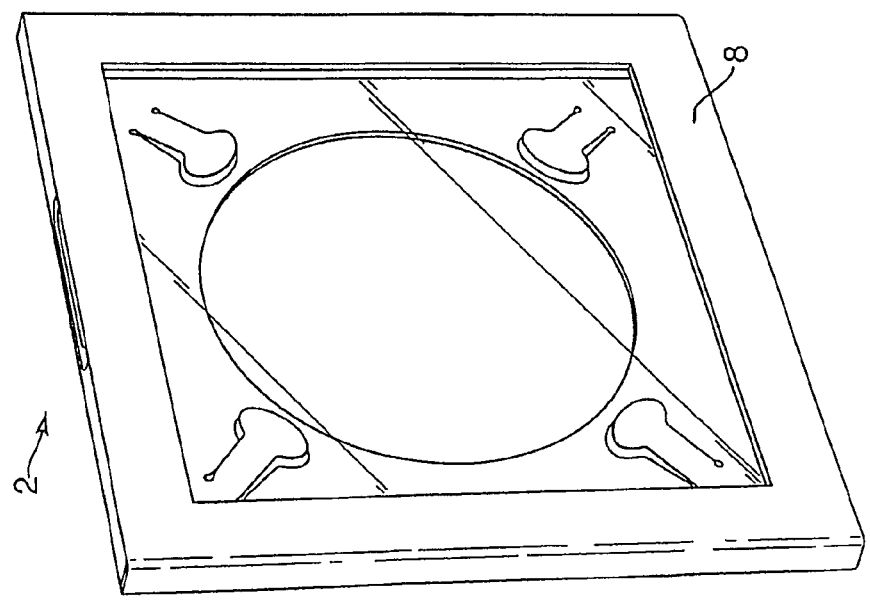
FIG. 2 is a perspective view of the display apparatus arranged in a closed configuration.
Figure 16:
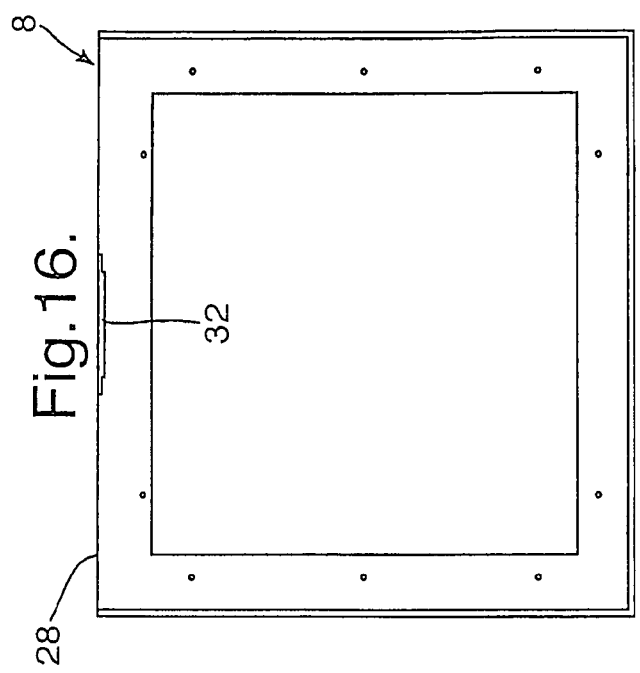
FIG. 16 is a plan view of the rear of the frame shown in FIG. 14.
Figure 15:
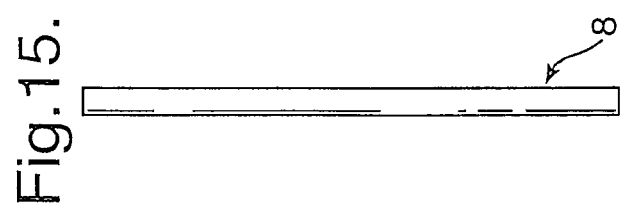
FIG. 15 is a side view of the frame of FIG. 14.
Figure 14:
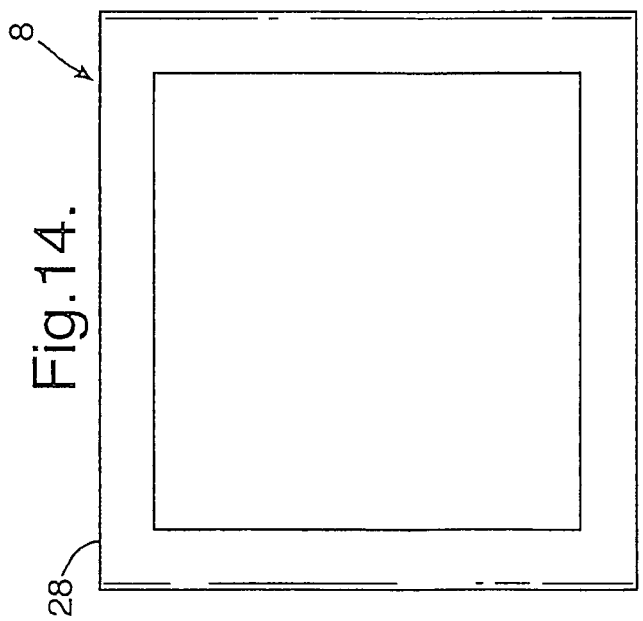
FIG. 14 is a plan view of the front of a frame of the display apparatus.
Figure 17:
FIG. 17 is a bottom view of the frame of FIG. 14.

With reference to FIG. 1, it will be seen that the display apparatus 2 comprises three major components. These three components are a backboard 4, a window 6, and a frame 8. In the assembled display apparatus 2, the window 6 is secured within the frame 8 and these two components are pivotally connected to the backboard 4. More specifically, the bottom edge 10 of the backboard 4 is pivotally connected to the bottom edge 12 of the window 6. The pivotal connection is provided by two generally cylindrically shaped pins 14 extending from either side of the window 6. The pins 14 are each locatable in a recess 16 provided in the bottom edge 10 of the backboard 4. The backboard 4 and the assembly of the window 6 and frame 8 may be thereby moved between open and closed configurations as will be explained in greater detail below.

The window 6 further comprises a catch element 18 which limits the extent by which the backboard 4 and the window may be rotated apart from one another. In the embodiment shown in the drawings, two catch elements 18 are provided on either side of the window 6. However, it will be understood that a single catch element 18 may be used. In the assembled display apparatus 2, each catch element 18 extends from the rear of the window 6 to the rear of the backboard 4. In the embodiment shown, this is facilitated by means of an aperture 20 in the backboard 4 through which a catch element 18 may pass. It will be understood that the catch element 18 is curved or hooked in an appropriate fashion so as to loop about the rear of the backboard 4 and thereby abut the rear of the backboard 4 when the backboard 4 and window 6 are rotated to a predetermined extent away from each other. Specifically, the catch element is arranged to allow the window 6 to rotate forward by no more than 15°. In use, this feature prevents the window 6 from falling forwards in a dangerous fashion when the display apparatus 2 is mounted on a wall.

The precise design of the backboard 4, window 6 and frame 8 will be apparent to the skilled person from the various views shown in FIGS. 6 to 17 of the accompanying drawings. With reference to FIG. 11, it will be seen that each catch element 18 has a sloping surface 48 for looping about the rear surface of the backboard 4. The sloping surface 48 is arranged at an acute angle to the window 6 which is equal to the acute angle between the window 6 and the backboard 4 when the display apparatus 2 is in the open configuration. A large contact area between the catch element 18 and the backboard 4 is thereby provided.

A locating ridge 23 extends to the rear of the secondary frame 22 along the bottom and side edges thereof. The ridge 23 is sized and shaped so as to receive an item to be displayed such as a record sleeve. The size of the ridge 23 is ideally such that the record sleeve received therein is prevented from sliding excessively from side to side.

It will be understood from the accompanying drawings that the pins 14 and catch elements 18 extend from, and may be integral with, a perimeter secondary frame 22 to which a pane of glass 24 is secured. The aesthetic appearance of the secondary frame 22 is improved by means of the primary frame 8 which is shaped and sized so as to cover the secondary frame 22 and the perimeter of the backboard 4. The arrangement is such that, when the display apparatus 2 is in the closed configuration, only the frame 8 and glass 24 is visible.

The window 6 and frame 8 may be secured to one another by any suitable means. For example, the frame 8 may be clipped to the secondary frame 22 of the window 6 by means of resiliently sprung clips. Alternatively, the window 6 and frame 8 may be secured to one another by means of an appropriate adhesive. Ideally, the frame 8 is releasably secured to the window 6 so that it may be readily replaced with a frame 8 having a different aesthetic appearance. Frames of different shapes, colours, textures and materials, for example, can then be used with the same window 6 and backboard 4.

The top edge 26 of the backboard 4 and the top edge 28 of the frame 8 are provided with clip elements 30, 32 which engage with one another when the display apparatus 2 is located in the closed configuration. The inter-engagement of the clip elements 30, 32 prevents the display apparatus 2 from opening accidentally. The clip elements 30, 32 are selectively releasable from one another so as to allow the display apparatus 2 to be moved from the closed configuration to the open configuration. Any suitable catch or latch mechanism may be used for the clip elements 30, 32. It will however be understood as being desirable to provide clip elements 30, 32 which are resiliently sprung so as to be snap fitted into engagement with one another in response to the display apparatus being moved to the closed configuration. Ideally, the clip elements 30, 32 are such that the display apparatus 2 cannot then be moved from the closed configuration without a user actively disengaging said elements 30, 32.

The backboard 4 comprises a perimeter ridge 34 in which the recesses 16, apertures 20 and backboard clip element 30 are located. The perimeter ridge 34 is sized and shaped so as to receive the ridge 23 of the secondary frame 22. Restriction of undesirable movement of the item to be displayed is assisted by means of one or more resiliently sprung fingers cut from the backboard 4. In the embodiments shown in the accompanying drawings, there are four such fingers 36, 38, 40, 42. These fingers are bent to the front of the backboard 4 so that, in the closed configuration, they tend to press an item to be displayed against the glass 24 of the window 6. This not only tends to prevent the item being displayed from moving in an undesirable fashion, but also provides a better quality of display. The resilient flexible character of the fingers also allows the display apparatus to readily accommodate record sleeves of different thicknesses.

It will be understood that the backboard 4 should be manufactured from an appropriate material if the fingers 36, 38, 40, 42 are to be fabricated by cutting and bending elements from the backboard 4.

If necessary, one or more spacer elements 44 may be provided to the rear of the backboard 4 to assist in ensuring that the display apparatus 2 mounts correctly on a wall without damage to either the wall or the display apparatus. The or each spacer element also assists in preventing the display apparatus 2 from twisting, rotating or sliding relative to a wall on which it is mounted. The or each spacer element 44 may be of a rubber material.

The rear of the backboard 4 is also provided with suitable means 46 for attaching the display apparatus 2 to a wall. In the embodiments shown in the accompanying drawings, an aperture is provided for this purpose which may receive a picture hook, screw or other projection extending from a wall. Alternatively, the backboard 4 may be provided with a screw or other projection (rather than an aperture) for hooking onto a wall.

It will further be seen from the accompanying drawings that the backboard 4 is provided with a circular cut-out 48. This feature assists in reducing the overall weight of the display apparatus 2 and can assist when removing an item from the display apparatus 2 in the event that the item becomes stuck. The cut-out 48 also allows the rear of a record sleeve to be read (or otherwise viewed) without having to remove the sleeve from the apparatus 2.

In use, the display apparatus 2 is mounted to a wall by means of the aperture 46. The window 6 and frame 8 may be unlatched from the top edge 26 of the backboard 4 through operation of the clips elements 30, 32. The window 6 and frame 8 may then be rotated downwardly about the bottom edge 10 of the backboard 4 so that the top edges 26, 28 of the backboard 4 and frame 8 become spaced from one another. The rotation of the window 6 and frame 8 is limited by engagement of the catch elements 18 (specifically the sloping surface 18a of each catch element 18) with the backboard 4. This restricted rotation prevents the window 6 and frame 8 from unsafely swinging in a downward direction in a manner which may cause injury.

With the display apparatus 2 located in an open configuration, a record and record sleeve may be conveniently placed in or removed from the interior of the display apparatus 2. The apparatus 2 may then be moved back to the closed configuration.

The present invention is not limited to the specific embodiment described above. Other arrangements and suitable materials will be apparent to a reader skilled in the art.

The invention claimed is:

1. An apparatus for displaying an item, the apparatus comprising:
   a first part and a second part, said first part defining a window through which an item positioned between said first and second parts can be seen and said second part including means for mounting on a wall;
   pivot means for pivotally connecting said first and second parts to one another;
   a catch element for limiting relative pivotal rotation of the first and second parts away from each other about said pivot means, said catch element extending from one of said first and second parts through an aperture in another one of said first and second parts and includes a hooked or curved end for contacting a back side of said another one of said first and second parts, and
   wherein one of the first part and the second part comprises a pressing means for pressing an item located between the first and second parts against the other one of said first and second parts.

2. The apparatus as claimed in claim 1, further comprising a releasable retaining means for releasably retaining the first and the second parts rotated into abutment with one another.

3. The apparatus as claimed in claim 2, wherein the releasable retaining means comprises a resiliently deformable clip.

4. The apparatus as claimed in claim 1, wherein said pressing means comprises a resiliently deformable element extending from the first part or the second part towards the other of said first or second parts.

5. The apparatus as claimed in claim 1, wherein said pressing means is cut and bent from the material of the first part or the second part.

6. The apparatus as claimed in claim 1, wherein the catch element is arranged to prevent the first part and the second part from rotating more than 90° relative to one another.

7. The apparatus as claimed in claim 1, wherein the catch element is arranged to prevent the first part and the second part from rotating more than 45° relative to one another.

8. The apparatus as claimed in claim 1, wherein the catch element is arranged to prevent the first part and the second part from rotating more than 15° relative to one another.

9. A record sleeve display apparatus comprising the apparatus as claimed in claim 1.

10. The apparatus as claimed in claim 1, wherein the first part comprises the catch element and the second part comprises a backboard, and wherein the catch element abuts against the rear of the backboard in use.

11. The apparatus as claimed in claim 10, wherein the catch element is curved or hooked so as to loop about the rear of the backboard and thereby abut the rear of the backboard when the backboard and the window are rotated to a predetermined extent away from each other.

12. The apparatus as claimed in claim 11, wherein the catch element comprises a sloping surface for looping about the rear surface of the backboard, wherein the sloping surface is arranged at an acute angle to the window which is equal to the acute angle between the window and the backboard when the apparatus is in an open configuration.

13. The apparatus as claimed in claim 1, wherein said pivot means comprises aligned pins which extend in opposite directions from one of said first and second parts, and aligned recesses in opposite sides of the other of said first and second parts, said pins rotatably fitting within respective recesses.

14. A method of using the apparatus as claimed in claim 1, the method comprising the step of placing a music record sleeve between the first and second parts.

15. A method as claimed in claim 14, wherein the apparatus is mounted to a wall.

16. A record sleeve display apparatus for displaying an item, the apparatus comprising a first part and a second part pivotally mounted to one another; wherein the first part comprises a window through which an item to be displayed may be viewed and the second part comprises means for mounting the apparatus to a wall, wherein the first part comprises a catch element for limiting relative rotation of the first and second parts, and wherein one of said first and second parts comprises a pressing means for pressing an item, located between the first and second parts, against the other one of said first and second parts, wherein the second part comprises a backboard, and wherein the catch element abuts against the rear of the backboard in use, the catch element being curved or hooked in an appropriate fashion so as to loop about the rear of the backboard and thereby abut the rear of the backboard when the backboard and the window are rotated to a predetermined extent away from each other and wherein the catch element comprises a sloping surface for looping about the rear surface of the backboard, wherein the sloping surface is arranged at an acute angle to the window which is equal to the acute angle between the window and the backboard when the apparatus is in an open configuration, the catch element being arranged to prevent the first and second parts from rotating more than 45° relative to one another.

* * * * *

UNITED STATES PATENT AND TRADEMARK OFFICE
CERTIFICATE OF CORRECTION

PATENT NO.        : 8,667,721 B2
APPLICATION NO. : 11/920001
DATED             : March 11, 2014
INVENTOR(S)       : Andrew N. Heeps It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Twenty-ninth Day of September, 2015

Michelle K. Lee
*Director of the United States Patent and Trademark Office*